US007630568B2

(12) United States Patent
Malvar

(10) Patent No.: US 7,630,568 B2
(45) Date of Patent: Dec. 8, 2009

(54) SYSTEM AND METHOD FOR LOW-RESOLUTION SIGNAL RENDERING FROM A HIERARCHICAL TRANSFORM REPRESENTATION

(75) Inventor: Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 697 days.

(21) Appl. No.: 11/089,927

(22) Filed: Mar. 25, 2005

(65) Prior Publication Data

US 2006/0215764 A1    Sep. 28, 2006

(51) Int. Cl.
    *G06K 9/46* (2006.01)
(52) U.S. Cl. .................................. 382/240
(58) Field of Classification Search ............... 382/240, 382/233
    See application file for complete search history.

(56) References Cited

U.S. PATENT DOCUMENTS

| 5,315,670 | A  | * | 5/1994  | Shapiro ............... | 382/240 |
| 6,324,560 | B1 | * | 11/2001 | Malvar ............... | 708/400 |
| 6,704,452 | B1 | * | 3/2004  | Takeo ................ | 382/233 |
| 6,771,828 | B1 |   | 8/2004  | Malvar ............... | 382/240 |
| 7,006,699 | B2 | * | 2/2006  | Malvar ............... | 382/240 |
| 2003/0068089 | A1 | * | 4/2003 | Sano et al. .......... | 382/232 |
| 2003/0185439 | A1 |   | 10/2003 | Malvar .............. | 382/166 |

FOREIGN PATENT DOCUMENTS

JP          08180194 A  *  7/1996

OTHER PUBLICATIONS

L. Williams, "Pyramidal parametrics," Proc. SIGGRAPH, Detroit, MI, pp. 1-11, Jul. 1983.
H. S. Malvar, "Biorthogonal and nonuniform lapped transforms for transform coding with reduced blocking and ringing artifacts," IEEE Trans. Signal Processing, vol. 46, pp. 1043-1053, Apr. 1998.
H. S. Malvar, A. Hallapuro, M. Karczewicz, and L. Kerofsky, "Low-complexity transform and quantization in H.264/AVC," IEEE Trans. Circuits and Systems for Video Technology, vol. 13, pp. 598-603, Jul. 2003.
T. D. Tran, J. Liang, and C. Tu, "Lapped transform via time-domain pre- and post-filtering," IEEE Trans. on Signal Processing, vol. 51, pp. 1557-1571, Jun. 2003.

(Continued)

*Primary Examiner*—Matthew C Bella
*Assistant Examiner*—Dennis Rosario
(74) *Attorney, Agent, or Firm*—Lyon & Harr, LLP; Mark A. Watson

(57) ABSTRACT

A "multi-resolution signal renderer" provides a computationally efficient process for generating reduced-resolution versions of a hierarchical transform coded digital signal from the encoded coefficients of that signal. The multi-resolution signal renderer begins by decoding the transform coded signal up to the highest hierarchical resolution not exceeding the desired signal resolution. The multi-resolution signal renderer then operates in one of two modes to generate reduced resolution signals. First, to generate signals at coded hierarchical resolution levels, DC coefficients of the transform coefficients are scaled, and then lowpass filtered to reduce aliasing in the signal. Second, to generate intermediate resolution signals between coded hierarchical resolution levels, the multi-resolution signal renderer retrieves the encoded coefficient blocks for the next highest resolution coding level, lowpass filters those blocks in the transform domain, performs an inverse transform, and then downsamples the resulting signal to the desired resolution.

25 Claims, 8 Drawing Sheets

OTHER PUBLICATIONS

D. P. Mitchell and A. N. Netravali, "Reconstruction filters in computer graphics," Proc. ACM SIGGRAPH, vol. 22, No. 4, p. 221-228, Aug. 1988.

R. Keys, "Cubic Convolution Interpolation for digital image processing," IEEE Trans. Acoustics, Speech and Signal Processing, vol. 29, pp. 1153-1160, Dec. 1981.

* cited by examiner

D = DC COEFFICIENT AFTER 2$^{ND}$ LEVEL LBT
L = LOW-FREQUENCY COEFFICIENTS = AC COEFFICIENTS OF 2$^{ND}$ LEVEL LBT
· = LOW-FREQUENCY COEFFICIENTS = AC COEFFICIENTS OF 1$^{ST}$ LEVEL LBT 4 x 4 1$^{ST}$ LEVEL LBT BLOCK

DISTRIBUTION OF LBT COEFFICIENTS FOR A 16 x 16 PIXEL MACROBLOCK FOR A HIERARCHICAL LBT TRANSFORM WITH N = 4 AND L = 1.

FIG. 5

SYSTEM AND METHOD FOR LOW-RESOLUTION SIGNAL RENDERING FROM A HIERARCHICAL TRANSFORM REPRESENTATION

BACKGROUND

1. Technical Field

The invention is related to a system for "downsampling" signals for which a transformed representation via a hierarchical transform is available, and in particular, to a system and method for rendering reduced resolution signals by operating on the hierarchical transformed representation of a signal in the transform domain using space-variant filters aligned to the blocks used in the hierarchical transform.

2. Background Art

Downsampling of signals of various dimensionality, such as, for example audio signals, images or video signals, biomedical data, economic time series data, etc., is a concept that is well known to those skilled in the art. In general, downsampling a signal operates to render or otherwise produce a reduced resolution version of the signal.

For example, an image displayed on the LCD on the back of a conventional digital still or video camera is typically a reduced resolution version of an image that has been captured by that camera. There are many such uses for signal downsampling, such as for use in simply fitting a signal, such as image, into an available display space or an available memory space, by generating reduced resolution versions of such signals. For example, if an original image captured by a digital camera has dimensions 1,792×1,200 pixels (e.g. from a 2-megapixel digital camera), it may be desired to quickly generate good-quality renditions of the image at various resolutions, such as, for example 896×600 (2:1 downsampling), 448×300 (4:1 downsampling), 224×150 (8:1 downsampling), or 112×75 (16:1 downsampling). Such reduced-resolution images are useful for picture previewing, displaying in small screens, or for displaying groups of pictures, or "thumbnail" representations of the pictures, in a single display window.

There are many well known techniques for downsampling signals. For example, with respect to images, one popular method involves separable downsampling (using the same filters in the horizontal and vertical directions), and using symmetric filter kernels that provide a good compromise between sharpness and aliasing artifacts. Typical filters used for image downsampling include averaging, bilinear, and bicubic filters.

In general, the common approach to signal downsampling of an encoded signal is to first decode the full-resolution signal, and then generate the reduced resolution version using conventional downsampling techniques. For example, to generate a 112×75 pixel version of a 1,792×1,200 encoded image, many conventional downsampling techniques will first decode the entire 1,792×1,200 encoded image, and then generate the 112×75 version of the image using four steps of bicubic downsampling. Downsampling of other types of encoded signals uses similar techniques.

Consequently, one problem with such conventional downsampling techniques is that producing downsampled versions of a signal tends to be computationally expensive, and is therefore relatively slow. This problem is especially evident when generating significantly downsampled versions of the signal. Further, as is well known to those skilled in the art, another problem which frequently results from downsampling of signals involves a degradation of the signal, which may include the introduction of artifacts into the signal, depending upon the types of filters used in downsampling the signal.

As is well known to those skilled in the art, a hierarchical transforms (HT), also known as generalized hierarchical transform is a transform operator that maps a signal (of any desired dimensionality) to transform coefficients at different levels of resolution, depending upon the type of transform used. Various types of hierarchical transforms include, for example, wavelet-based transforms (WT) and lapped transforms, such as, for example, the lapped biorthogonal transform (LBT).

For example, many conventional compression algorithms employ a wavelet transform (WT) followed by quantization and entropy encoding to provide for hierarchical encoding of such signals. One useful feature of using WTs is that WT-based codecs naturally allow for image reconstruction that is progressive in resolution, typically at resolution factors of 2 (e.g., 1:1, 2:1, 4:1, 8:1, etc.). In fact, codecs based on the well-known JPEG-2000 standard are implemented using wavelet transforms. However, one disadvantage to using codecs based on WTs, is that in many cases, such codecs are less computationally efficient, and typically require a larger memory footprint, than other hierarchical transforms such as codecs implemented using LBTs. Further, because there are more hierarchical encoding levels using wavelets such as those described above, there is an additional likelihood of aliasing or other artifacts appearing in the various hierarchically encoded levels of the signal relative to LBT-based codecs.

In general, as is well known to those skilled in the art, LBTs take an input signal, and divide that signal into blocks of N samples, which are then transformed by a core transform operator that maps N signal samples into N transform coefficients. Then, for each block, L coefficients are brought to the next level of transformation and grouped by a frequency index. For each succeeding resolution level, this process is simply repeated. Since for each block, only L of N coefficients are brought to the next level, the signal length is reduced by a factor N/L at every transform stage.

Unfortunately, conventional hierarchical codecs using LBT's typically use N=4 (or larger) and L=1, so that only the lowest-frequency (usually called DC) coefficient is brought to the next level. As a result, in this example, resolution at each hierarchical level is reduced by a factor of N/L=4 in each signal dimension, at each level. Consequently, in order to render intermediate resolution levels other than those specifically encoded (e.g., 1:1, 4:1, 16:1, 64:1, 256:1, etc.) conventional downsampling techniques are again used, as described above. In particular, with conventional LBT-based HT schemes, the signal is then decoded to the resolution level immediately above the desired resolution level, and then the decoded signal is downsampled to the desired level using conventional downsampling techniques (such as bicubic low-pass filtering of images). Again, such downsampling techniques in the signal domain tend to be computationally expensive, and may introduce distortions or other artifacts into the signal.

Therefore, what is needed is a system and method for providing reduced resolution versions of a hierarchical transform representation of a signal while minimizing or eliminating the need to directly downsample higher resolution versions of the signal, depending upon the desired resolution level. As a result, signal degradation resulting from multiple levels of downsampling is reduced or eliminated. Further, such a system and method should operate to reduce the computational overhead necessary to generate such reduced resolution versions of the signal.

SUMMARY

A system and method as described herein provides a "multi-resolution signal renderer" which provides a computationally efficient process for generating reduced-resolution versions of a hierarchically transform coded digital signal given the coefficients of a hierarchical transform decomposition of that signal.

It should be noted that for purposes of explanation, the generation of reduced resolution versions of a signal will be generally described herein with respect to digital images. However, in view of the detailed description provided herein, it should be understood that the reduced resolution rendering capability provided by the multi-resolution signal renderer is applicable to digital signals of any dimensionality, including, for example, audio signals, images, biomedical signals such as EEG's and EKG's, etc. Further, the multi-resolution signal renderer is also capable of operating with existing signals encoded using existing codecs (coder/decoder) which provide hierarchical transforms coded signals based on block transforms. However, for purposes of explanation, these hierarchical transforms will be described herein using lapped biorthogonal transforms (LBT) as a specific example of a block transform that is operable with the multiresolution signal renderer.

In general, the multi-resolution signal renderer described herein begins operation by decoding the transform coded signal up to the highest hierarchical resolution not exceeding the desired signal resolution. The multi-resolution signal renderer then operates in one of two modes to generate reduced resolution signals. First, to generate signals at coded hierarchical resolution levels, DC coefficients of the transform coefficients are scaled, and then lowpass filtered to reduce artifacts and aliasing in the signal. Second, to generate intermediate resolution signals between coded hierarchical resolution levels, the multi-resolution signal renderer retrieves the encoded coefficient blocks for the next highest resolution coding level, scales those coefficients as a function of the hierarchical resolution level, lowpass filters those blocks in the transform domain to reduce artifacts and aliasing in the resulting signal, performs an inverse transform, and then downsamples the resulting signal to the desired resolution level.

As noted above, lowpass filtering is applied in the transform domain to the coefficient blocks prior to performing an inverse transform on those blocks to recover the signal. In general, the point of such filtering is to approximate an ideal filter for passing only those frequencies of the coefficient blocks corresponding to the desired signal resolution. In contrast, the lowpass filter applied to the scaled DC coefficients differs from the transform-domain filtering of the coefficient blocks in that the scaled DC coefficient filtering is applied in the signal domain. Further, the scaled DC coefficient filtering is generally a relatively mild lowpass filter which is used simply to reduce high frequency aliasing in the rendered signal.

One advantage afforded by the multi-resolution signal renderer is that, given a hierarchical transform representation of a signal, such as an image, it provides a much faster generation of reduced-resolution versions of the image when compared to conventional image downsampling techniques, such as, for example, bicubic filtering. This increase in generation speed becomes increasingly apparent as the size of the image being rendered becomes smaller.

Consequently, one advantageous use of the multi-resolution signal renderer is that it provides for very fast "mipmap" generation from an encoded image. As is well known to those skilled in the art, a "mipmap" is a set of reduced-resolution renditions of an image (or an image texture map) at dimensions that change by a factor of 2:1 in each of the horizontal and vertical directions. In other words, a typical mipmap includes reduced resolution versions of an image at resolutions of 1:1, 2:1, 4:1, 8:1, etc. Mipmaps are frequently used in applications including computer games, and other computer imaging applications where it is desirable to quickly provide various reduced resolution versions of images (such as, for example, in the rendering pipelines of conventional computer graphics cards). In fact, mipmaps are frequently decoded from the input signal prior to being needed, stored to a cache memory, and then simply called from memory when needed.

However, LBT-based hierarchical codecs typically encode images at hierarchical resolution levels equating to a factor of four (e.g., 1:1, 4:1, 16:1, 64:1, etc.). Consequently, in order to generate mipmaps, the multi-resolution signal renderer operates to decode the LBT-based hierarchical coded images to intermediate levels (e.g., 1:1, 2:1, 4:1, 8:1, etc.). However, more generally, the multi-resolution signal renderer operates to decode LBT-based hierarchical coded images to any desired arbitrary resolution level (e.g., 1:1, 3.14:1, 6.3:1, etc.).

Further, it should also be noted that LBT-based hierarchical codecs may also be designed to encode images (or other signals) at hierarchical resolution levels equating to larger factors, such as factors of eight (1:1, 8:1, 64:1, 512:1, etc), or larger. The use of increasingly large LBT factors for encoding the hierarchical resolution is typically useful for encoding very large signals (such as extremely high resolution images), when it is desirable to have a relatively small set of hierarchical transform levels of such signals.

In view of the above summary, it is clear that the multi-resolution signal renderer described herein provides an improved system and method for generating reduced-resolution versions of a hierarchically transform coded digital signal given the coefficients of a hierarchical transform decomposition of that signal. In addition to the just described benefits, other advantages of this system and method will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

FIG. 5 illustrates the distribution of lapped biorthogonal transform (LBT) coefficients for a 16×16 pixel macroblock, for a hierarchical LBT transform with N=4 and L=1.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
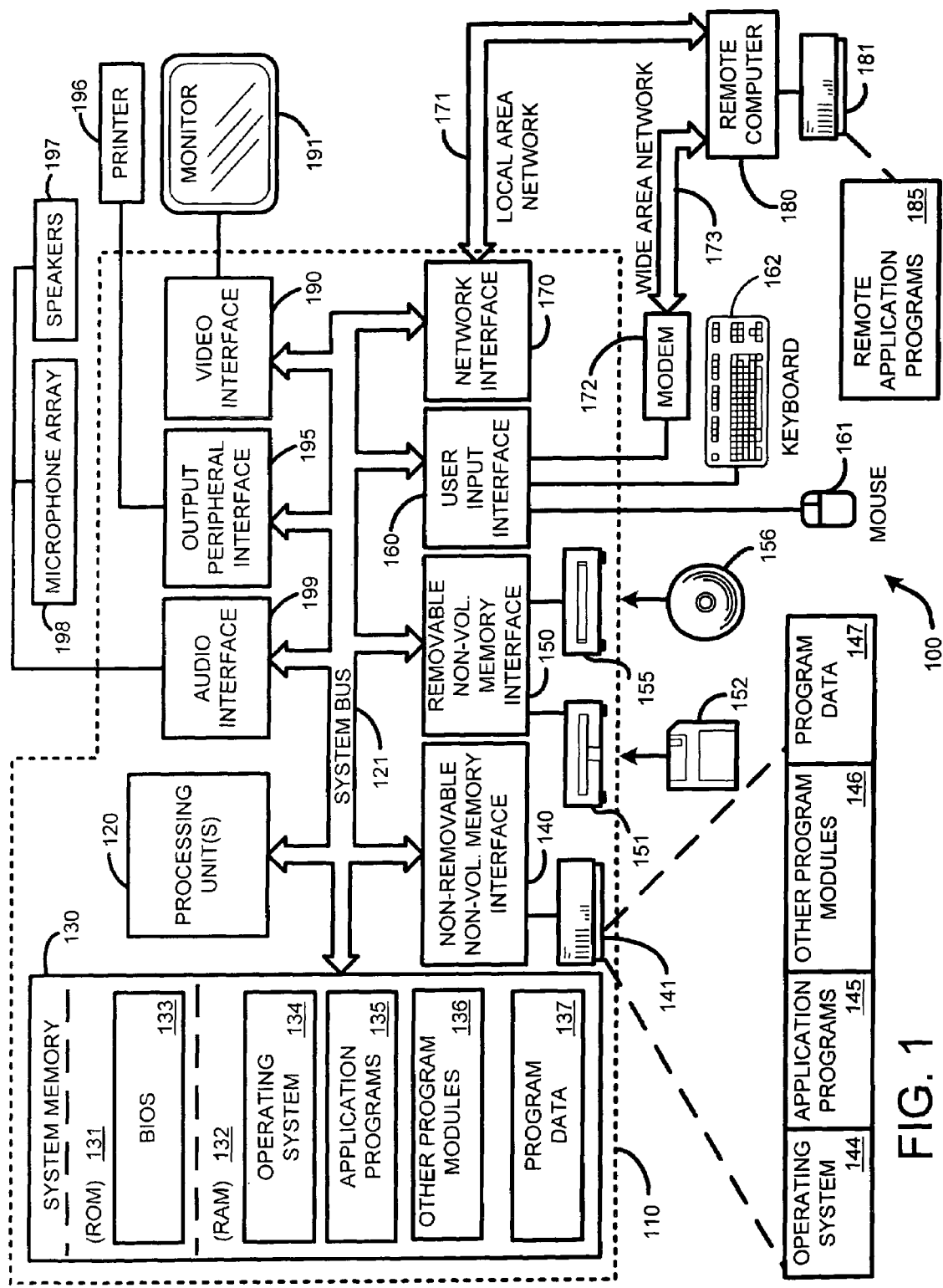
FIG. 1 is a general system diagram depicting a general-purpose computing device constituting an exemplary system for implementing a multi-resolution signal renderer for rendering low resolution signals from a hierarchical transform representation of that signal.

1.0 Exemplary Operating Environment:

FIG. 1 illustrates an example of a suitable computing system environment 100 with which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198, or other receiver array (not shown), such as, for example, a directional radio antenna array, a radar receiver array, etc. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. Still further input devices (not shown) may include receiving arrays or signal input devices, such as, for example, a directional radio antenna array, a radar receiver array, etc. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of a system and method for implementing a "multi-resolution signal renderer" for rendering low resolution signals from a hierarchical transform representation of that signal.

2.0 Introduction:

A system and method as described herein provides a "multi-resolution signal renderer" which provides a computationally efficient process for generating reduced-resolution versions of a hierarchically transform coded digital signal given the coefficients of a hierarchical transform decomposition of that signal.

It should be noted that for purposes of explanation, the generation of reduced resolution versions of a signal will be generally described herein with respect to digital images. However, in view of the detailed description provided herein, it should be understood that the reduced resolution rendering capability provided by the multi-resolution signal renderer is applicable to digital signals of any dimensionality, including, for example, audio signals, images, biomedical signals such as EEG's and EKG's, etc. Further, the multi-resolution signal renderer is also capable of operating with existing signals encoded using existing codecs (coder/decoder) which provide hierarchical transforms coded signals based on block transforms. However, for purposes of explanation, these hierarchical transforms will be described herein using lapped biorthogonal transforms (LBT) as a specific example of a block transform that is operable with the multiresolution signal renderer.

For example, as is well known to those skilled in the art, LBTs take an input signal, and divide that signal into blocks of N samples, which are then transformed by a core transform operator that maps N signal samples into N transform coefficients. Then, for each block, L coefficients are brought to the next level of transformation and grouped by a frequency index. For each succeeding resolution level, this process is simply repeated. Since for each block, only L of N coefficients are brought to the next level, the signal resolution is reduced by a factor N/L at every transform stage. Conventional codecs using LBT's typically use an N=4 and L=1. Thus, in the typical case where N=4 and L=1, the signal resolution is reduced by an additional factor 4/1 at every transform stage (e.g., 1:1, 4:1, 16:1, 64:1, 256:1, etc.).

2.1 System Overview:

In general, the system and method described herein for reduced-resolution rendering of hierarchical transform encoded signals begins operation by first decoding the transform coded signal up to the highest hierarchical resolution not exceeding the desired signal resolution. The multi-resolution signal renderer then operates in one of two modes to generate reduced resolution signals, as described below.

First, to generate signals at coded hierarchical resolution levels, DC coefficients of the transform coefficients are scaled, and then lowpass filtered to reduce artifacts and aliasing in the signal. Second, to generate intermediate resolution signals between coded hierarchical resolution levels, the multi-resolution signal renderer retrieves the encoded coefficient blocks for the next highest resolution coding level, scales those coefficients as a function of the hierarchical resolution level, lowpass filters those blocks in the transform domain to reduce artifacts and aliasing in the resulting signal, performs an inverse transform, and then downsamples the resulting signal to the desired resolution level. Further, in the case where the full resolution signal is to be rendered from the hierarchical transform encoded signal, the multi-resolution signal renderer simply defaults to a conventional decoding of the entire signal.

As noted above, lowpass filtering is applied in the transform domain to the coefficient blocks prior to performing an inverse transform on those blocks to recover the signal. In general, the point of such filtering is to approximate an ideal filter for passing only those frequencies of the coefficient blocks corresponding to the desired signal resolution. For example, assuming that the signal resulting from performing the inverse transform is to be downsampled at a ratio of 2:1 to obtain the desired intermediate resolution level, and assuming coefficient blocks of size 4×4, then the simplest "ideal" lowpass filter would be to apply a gain function of one's and zero's to keep only the top left 2×2 coefficients of each coefficient block.

However, such an abrupt gain matrix would typically produce noticeable artifacts in the resulting signal. Consequently, gain patterns exhibiting a smoother decay from about one to about zero are preferred. Further, it should be noted that in one embodiment, transform domain filters (or gain patterns) are custom tailored in advance for each potential intermediate resolution level. Consequently, a different filter can be used when obtaining an intermediate resolution level of 2:1 than when obtaining an intermediate resolution level of 2.5 to 1. However, it should also be noted that the same filter could also be used for both intermediate resolution levels in this example, with the appropriate level of downsampling being applied to the signal (e.g., 2:1 or 2.5:1) following application of the inverse transform to the transform-domain filtered coefficients. However, the quality of the resulting reduced resolution signal may be better when using filters specifically designed for each intermediate resolution level.

The lowpass filter applied to the scaled DC coefficients differs from the lowpass filtering described above in several respects. For example, unlike the filter applied in the transform domain, the filter applied to the DC coefficients is applied in the signal domain. Note that because of the smoothness of the LBT basis functions, the DC coefficients of an LBT representation, when grouped together, form an image that corresponds to the original image filtered and downsampled by a factor of N=4 in each dimension. Note that this concept is well known to those skilled in the art. However, because the DC basis function of the LBT direct transform is not as good a lowpass filter as those of the inverse transform, the lowpass filter (LPF) is applied to reduce high-frequency aliasing. Not much filtering is needed, so a relatively mild lowpass filter can be used.

One advantage afforded by the multi-resolution signal renderer is that, given a hierarchical transform representation of a signal, such as an image, it provides a much faster generation of reduced-resolution versions of the image when compared to conventional image downsampling techniques, such as, for example, bicubic filtering, which typically operate by applying multiple downsampling steps to a fully decoded signal. This increase in generation speed becomes increasingly apparent as the size of the image being rendered becomes smaller.

For example, in generating a preview version of dimensions 112×75-pixels from a 1,792×1,200-pixel image, the common approach is to decode the full-resolution (1,792×1,200) image and then generate the 112×75 version via four steps of bicubic downsampling. In contrast, the multi-resolution signal renderer described herein renders a good quality 112×75-pixel image by decoding only the hierarchical transform data up to that resolution level, and then directly generating the image, as described herein without the need to apply the multiple bicubic filtering steps noted above. As a result, the multi-resolution signal renderer can produce a reduction in memory allocation of up to 16:1, and a speedup factor of up to 10× relative to conventional downsampling schemes, depending upon the signal resolution being rendered.

Consequently, one advantageous use of the multi-resolution signal renderer is that it provides for very fast "mipmap" generation from an encoded image. As is well known to those skilled in the art, a "mipmap" is a set of reduced-resolution renditions of an image (or an image texture map) at dimensions that typically change by a factor of 2:1 in each of the horizontal and vertical directions. In other words, a typical mipmap includes reduced resolution versions of an image at resolutions of 1:1, 2:1, 4:1, 8:1, etc. Mipmaps are frequently used in applications including computer games, and other computer imaging applications where it is desirable to quickly provide various reduced resolution versions of images (such as, for example, in the rendering pipelines of conventional computer graphics cards). In fact, mipmaps are frequently decoded from the input image signal prior to being needed, stored to a cache memory, and then simply called from memory when needed.

As noted above, LBT-based hierarchical codecs typically encode images at hierarchical resolution levels equating to a factor of four (e.g., 1:1, 4:1, 16:1, 64:1, etc.). Consequently, in order to generate mipmaps, the multi-resolution signal renderer operates to decode the LBT-based hierarchical coded images to intermediate levels (e.g., 2:1, 8:1, etc.) between the hierarchical encoding levels noted above. However, more generally, the multi-resolution signal renderer operates to decode LBT-based hierarchical coded images to any desired arbitrary resolution level (e.g., 1:1, 3.14:1, 6.3:1, etc.) in addition to providing for decoding of the various hierarchical encoding levels inherent in the initial encoding of the input signal.

Further, it should also be noted that LBT-based hierarchical codecs may also be designed to encode images (or other signals) at hierarchical resolution levels equating to larger factors, such as factors of eight (1:1, 8:1, 64:1, 512:1, etc), or larger. The use of increasingly large LBT factors for encoding hierarchical resolution levels is typically useful for encoding very large signals (such as extremely high resolution images, including, for example high resolution satellite images), when it is desirable to have a relatively small set of hierarchical transform levels of such signals.

Figure 2:
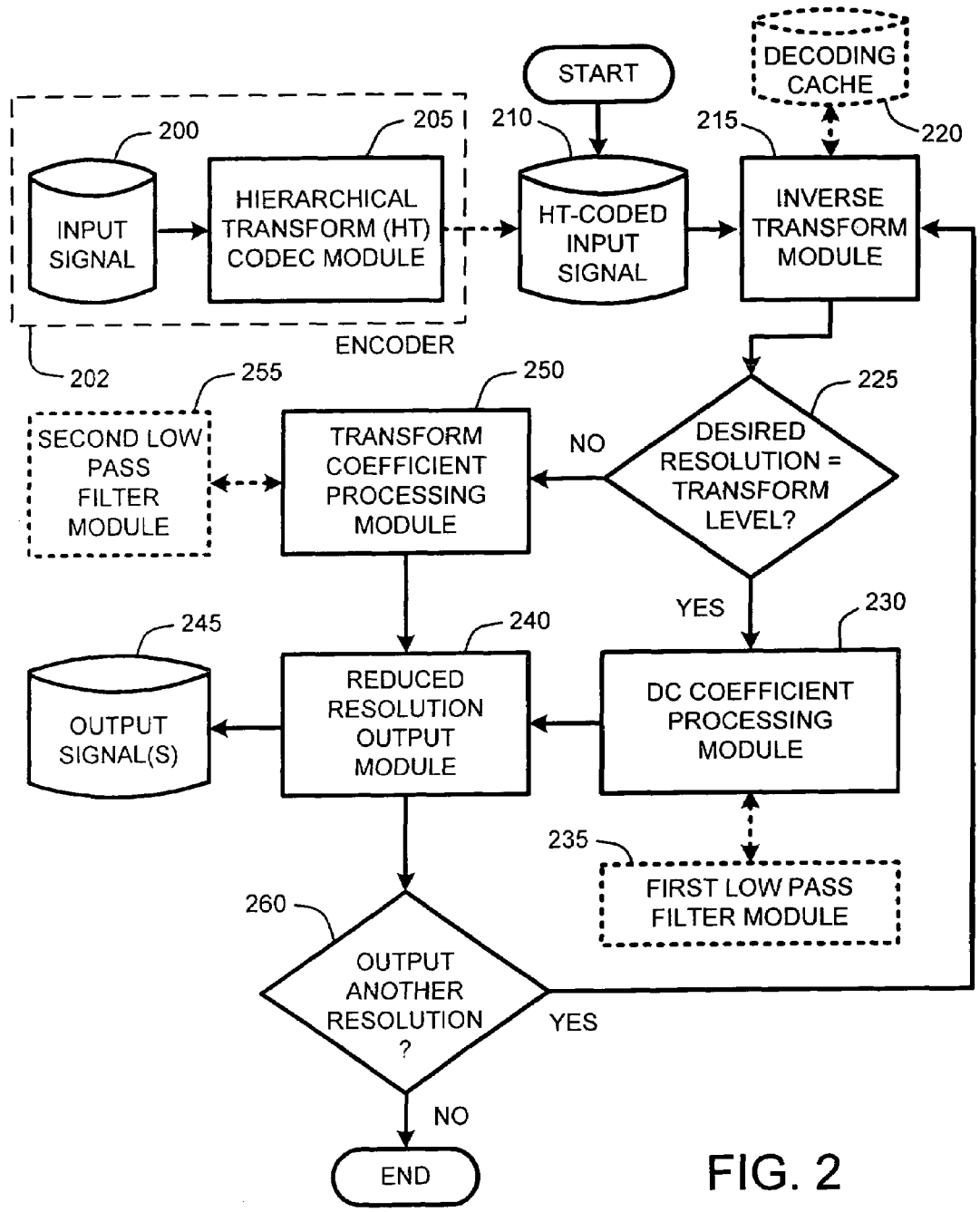
FIG. 2 illustrates an exemplary system diagram showing exemplary program modules for implementing a multi-resolution signal renderer for rendering low resolution signals from a hierarchical transform representation of that signal.

2.2 System Architecture:

The processes summarized above are illustrated by the general system diagram of FIG. 2. In particular, the system diagram of FIG. 2 illustrates the interrelationships between program modules for implementing a system and method for rendering reduced resolution versions of a hierarchical block-transform encoded signal. As noted above, this system and method is generally referred to herein as a "multi-resolution signal renderer." It should be noted that any boxes and interconnections between boxes that are represented by broken or dashed lines in FIG. 2 represent alternate embodiments of the multi-resolution signal renderer described herein, and that any or all of these alternate embodiments, as described below, may be used in combination with other alternate embodiments that are described throughout this document.

In general, the multi-resolution signal renderer operates to render reduced resolution versions of a hierarchical block-transform encoded signal at arbitrary resolutions. The multi-resolution signal renderer begins decoding operations by providing a hierarchical transform (HT) encoded signal 210 to an inverse transform module 215. The HT encoded signal 210 is usually generated, using conventional encoding techniques, by an HT codec module 205 operating on an input signal 200 such as an image, in an encoder 202 (e.g. as implemented within a digital camera).

For each reduced resolution version of the HT encoded input signal 210, the inverse transform module 215 decodes the HT coded input signal 210 up to the nearest hierarchical encoding level not exceeding the desired resolution. However, in one embodiment, an optional decoding cache 220 is used to store or otherwise cache decoded transform coefficient blocks for use in subsequent decoding operations rather than repeating the decoding operations once they have already been done for some hierarchical decoding level.

In either case, once the inverse transform module 215 decodes the HT coded input signal 210 up to the nearest hierarchical encoding level not exceeding the desired resolution, a determination is made 225 as to whether the desired reduced resolution version of the input signal 210 is equal to the resolution at the hierarchical level of the decoded portion of the input signal. In the case where the desired resolution corresponds to the current hierarchical level, the DC coefficients of the decoded transform coefficients are grouped together and scaled by a DC coefficient processing module 230. The amount of scaling applied to the grouped DC coefficients is a function of the hierarchical transform level which is being decoded, and the number N of transform coefficients being mapped at each level, as discussed in greater detail below in Section 3.2 The result is a reduced resolution version of the original input signal 200 having the desired resolution.

However, the reduced resolution version of the original input signal 200 generated through a scaling of the grouped DC coefficients may exhibit high frequency aliasing. Consequently, in one embodiment, the scaled DC coefficients are then lowpass filtered in the signal domain via a first lowpass filter module 235 to reduce aliasing in the signal. Note that the filtering operations of the first lowpass filter module 235 are described in further detail below in Section 3.3.

At this point, whether or not lowpass filtering has been applied to the rendered signal, that signal is provided to a reduced resolution output module 240 which outputs the reduced resolution version of the original input signal 200 to a file, database, or cache 245 of output signals for use as desired.

For intermediate resolutions not directly corresponding to one of the hierarchical encoding levels, a transform coefficient processing module 250 receives the decoded transform coefficient blocks decoded from the preceding hierarchical level by the inverse transform module 215, scales those coefficients as a function of the hierarchical resolution level, and then uses a second lowpass filter module 255 to apply a lowpass filter to those coefficient blocks. However, unlike the lowpass filtering provided by the first lowpass filter module 235 which operates in the signal domain, the lowpass filtering of the second lowpass filter module 255 operates in the transform domain. Note that the filtering operations of the second lowpass filter module 255 are described in further detail below in Section 3.3.

Once the lowpass filtering 255 has been applied to the decoded transform coefficient blocks, the transform coefficient processing module 250 then performs an inverse transform operation on the coefficient blocks, and downsamples the resulting signal to achieve the desired intermediate resolution level. The downsampling applied at this stage can be any conventional downsampling technique, including, for example, signal averaging, or conventional downsampling filters such as bilinear or bicubic filters. At this point, the downsampled signal is then provided to the reduced resolution output module 240 which again outputs the reduced resolution version of the original input signal 200 to a file, database, or cache 245 of output signals for use as desired.

The processes described above then repeat 260 for so long as it desired to generate additional reduced resolution versions of the original input signal.

3.0 Operation Overview:

The above-described program modules are employed for implementing the multi-resolution signal renderer. As summarized above, the multi-resolution signal renderer provides a computationally efficient system and method for rendering reduced-resolution versions of a hierarchical transform coded digital signal from the encoded coefficients of that signal. The following sections provide a detailed operational discussion of the multi-resolution signal renderer and of exemplary methods for implementing the aforementioned program modules.

Figure 3A:
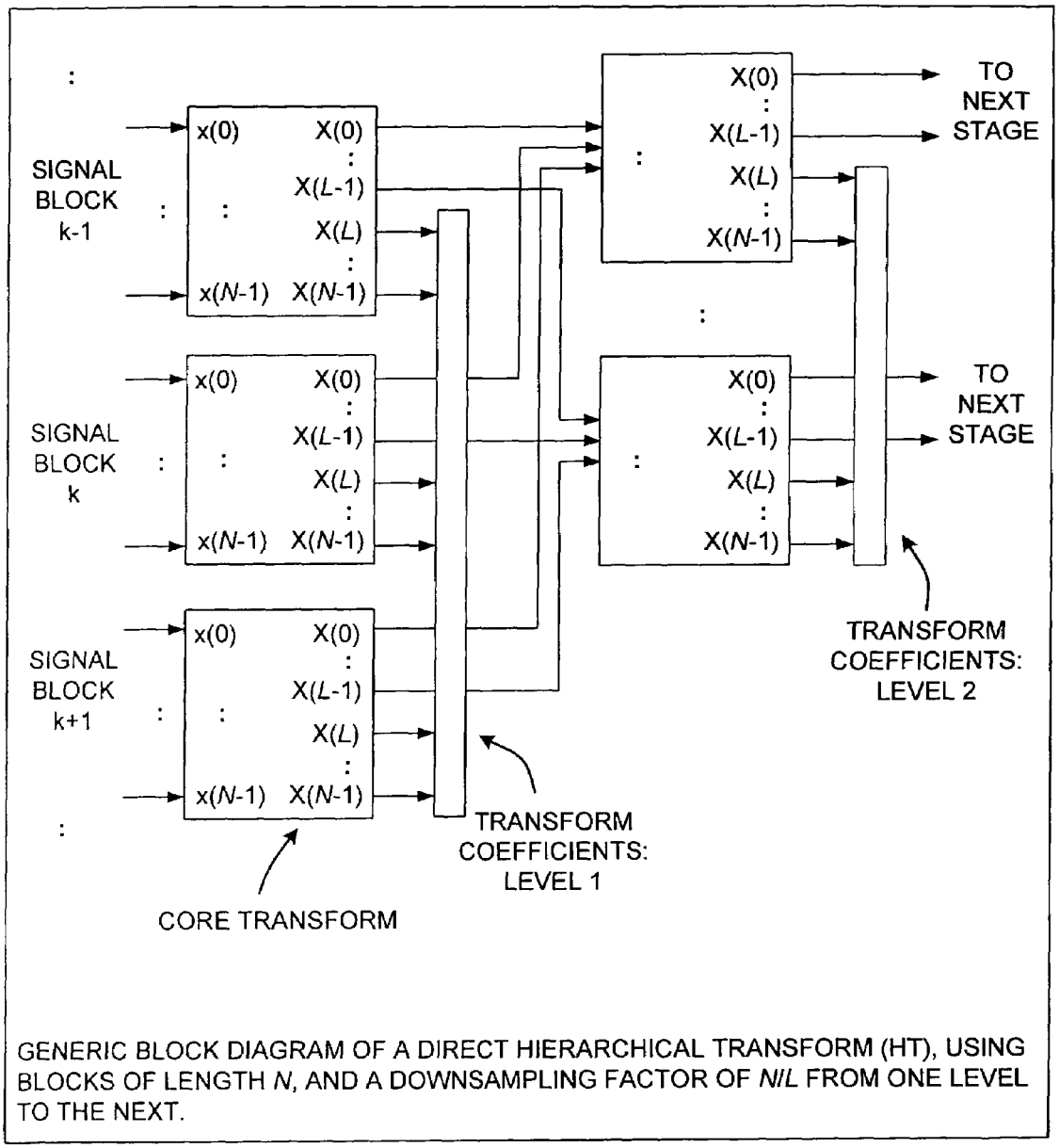
FIG. 3A illustrates a generic block diagram of a direct hierarchical transform (HT), using blocks of length N, and a downsampling factor of N/L from one hierarchical transform level to the next.
Figure 3B:
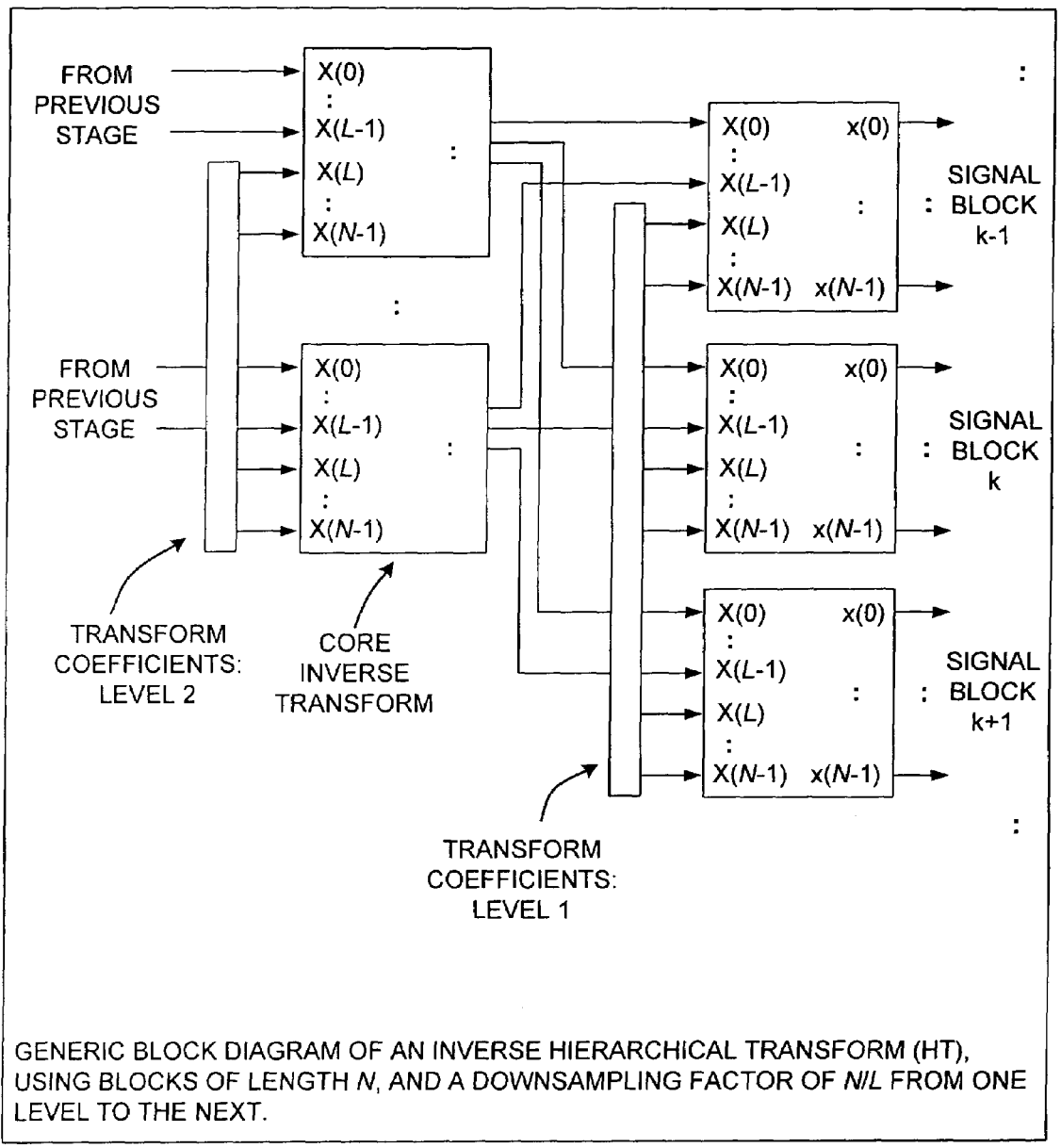
FIG. 3B illustrates a generic block diagram of an inverse hierarchical transform (HT), using blocks of length N, and a downsampling factor of N/L from one hierarchical transform level to the next.

3.1 Hierarchical Transforms:

As is well known to those skilled in the art, a hierarchical transform (HT), also known as generalized hierarchical transform, is a transform operator that maps a signal to transform coefficients at different levels of resolution, as shown in FIGS. 3A and 3B. It should be noted that these diagrams apply to one-dimensional signals for purposes of illustration. However, it is well known to those skilled in the art how to extend such transforms to two-dimensional signals, such as images, or to multi-dimensional signals. In general, as illustrated by the direct transform of FIG. 3A, a generic HT divides the input signal into blocks of N samples, which are then transformed by a core transform operator that maps N signal samples into N transform coefficients. Then, for each block, L coefficients are brought to the next level of transformation and then grouped by frequency index. In the next level the process is repeated. Note that FIG. 3B simply illustrates a generic inverse transform corresponding to the direct transform of FIG. 3A. In general, the inverse transform is the transpose of that for the direct transform. In other words, the inverse HT recovers the original signal if the core inverse transforms are the inverse operators of the core transforms used in the direct HT.

In FIGS. 3A and 3B, a hierarchy of only two levels is illustrated. However, it should be clear that there can be as many levels as desired, with a larger number of levels directly corresponding to a larger number of directly available resolutions. Since for each block only L of N coefficients are brought to the next level, it can be seen that the signal length is reduced by a factor N/L at every transform stage.

In a typical configuration for image processing using conventional hierarchical transform coders, values of N=4 and L=1 are typical. Given such values (e.g., L=1), only the lowest-frequency (usually called DC) coefficient is brought to the next level. Thus, resolution is reduced by a factor of N/L=4 in each signal dimension, at each level.

Note that FIGS. 3A and 3B show the core transform as a simple block transform for purposes of illustration. However, in practice a smoother representation is typically obtained with overlapping transforms, such as the lapped biorthogonal transform (LBT). For a typical LBT, 2N input samples are mapped into N transform coefficients. Further, the transform of block k uses also N/2 coefficients from block k−1 and N/2 coefficients from block k+1. In addition, the first and last block are specially treated using signal reflection, as is well known to those skilled in the art.

Figure 4A:
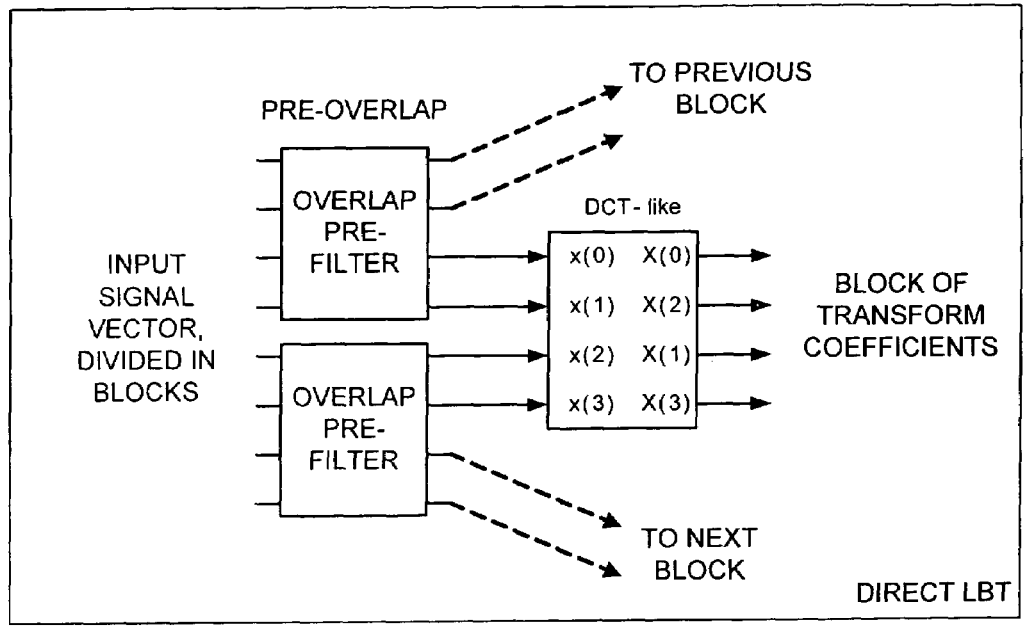
FIG. 4A illustrates a generic block diagram of a direct lapped biorthogonal transform (LBT) for N=4.
Figure 4B:
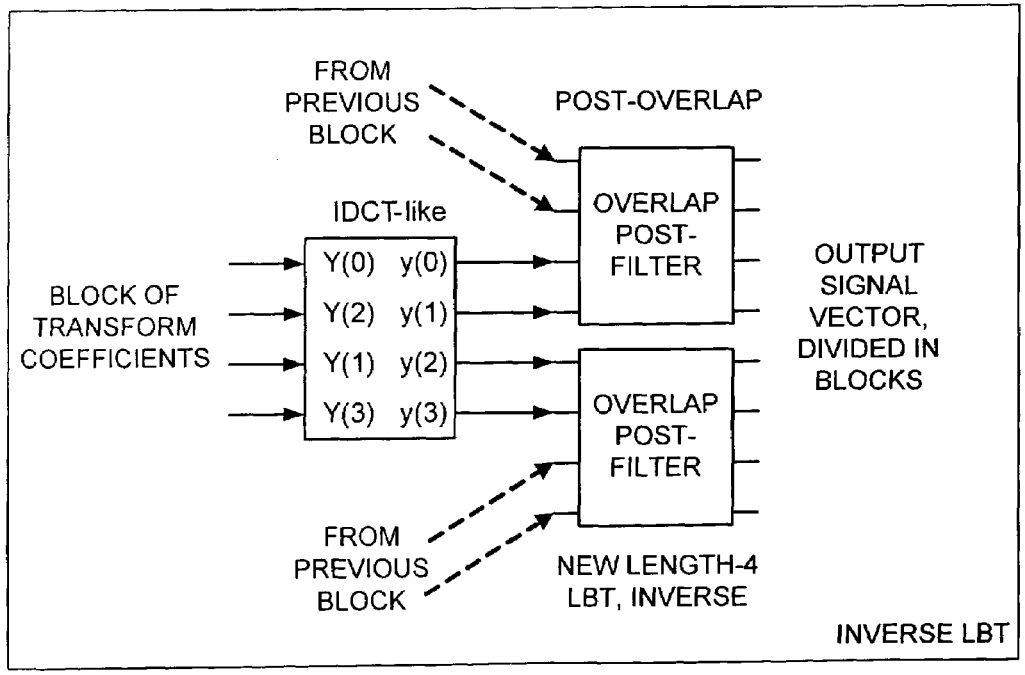
FIG. 4B illustrates a generic block diagram of an inverse LBT corresponding to the direct LBT of FIG. 4A.

FIGS. 4A and 4B illustrate conventional block diagrams of an LBT for N=4, with FIGS. 4A illustrating the direct transform, and 4B illustrating the inverse transform. Note that the LBT transform structures illustrated in FIGS. 4A and 4B, using pre- and post-filters, are known to those skilled in the art. In addition, transform structures based on frequency-domain overlapping can also be used in such LBT transforms.

3.1.1 Two-Dimensional Hierarchical Transforms:

To provide an illustration of a tested embodiment of the multi-resolution signal renderer, the multi-resolution signal renderer will be discussed below, in Section 3.2, with respect to the problem of generating a mipmap corresponding to a digital image, assuming that the transform coefficients of that image are available in a hierarchical lapped biorthogonal transform with two levels, with N=4 and L=1. Note that the following example is provided for purposes of explanation only. In fact, the generalization of the rendering of reduced resolution signals from other signal types, including one- or multi-dimensional signals, and for the use of different structures of the hierarchical transform (with different choices for the parameters N and L, and different choices for the number of levels and even the core transform at each level should be obvious to those skilled in the art in light of the discussion provided herein with respect to the following example.

When a two-dimensional hierarchical LBT is applied to an image with N=4 and L=1, each 4×4 pixel block is processed by a two-dimensional LBT, thereby producing a first-level transform. Then, the DC coefficients are grouped into 4×4 blocks, and are further transformed by two-dimensional LBTs. The effect of these two levels of transforms is that each 16×16 pixel macroblock is transformed to the LBT domain, producing a hierarchical LBT coefficient pattern as illustrated by FIG. 5.

Figure 6:
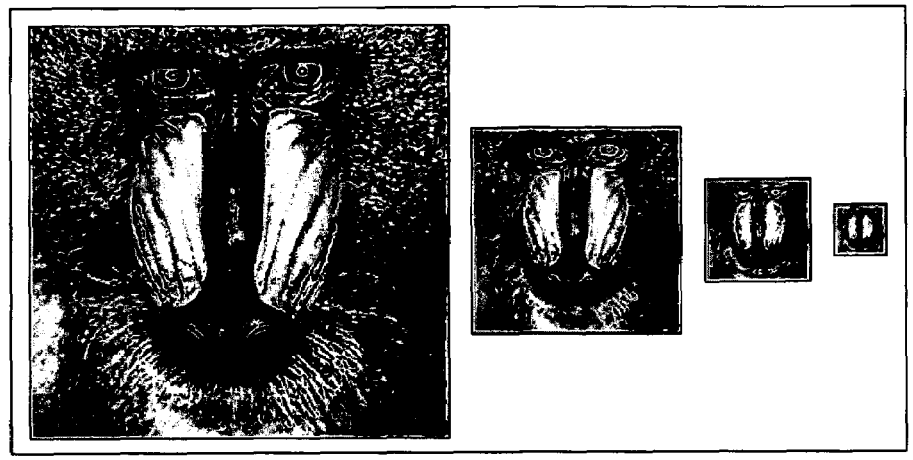
FIG. 6 illustrates the first four levels (e.g., levels 0-3) of a mipmap for the "baboon" standard image, with the highest resolution image, mipmap level 0, represented on the far left, and the lowest resolution image, mipmap level 3, represented on the far right.

3.2 Generating Mipmaps from HT Representations of an Image:

As noted above, a mipmap is a collection of bitmap images or texture maps. If mipmap Level 0 is the original image, of dimensions R×S pixels, for example, then, mipmap Level 1 is the next lower resolution image, of dimensions R/2×S/2, mipmap Level 2 is the next lower resolution image, of dimensions R/4×S/4, and so on, until the smallest dimension of one of the levels is just one pixel, so that further reduction in resolution is meaningless. An example of the first four levels of a typical mipmap is illustrated in FIG. 6 which shows an example of the first four levels (Levels 0-3) of a mipmap for the "baboon" standard image.

In conventional systems, mipmaps are typically generated by downsampling the original bitmap (Level 0) by a factor of two, after lowpass filtering with a good downsampling filter (e.g. bicubic), to generate the Level 1 bitmap. The Level 1 bitmap is then downsampled by a factor of two, with the same filters, to generate the Level 2 bitmap, and so on. Unfortunately, such processing is computationally expensive, and may result in loss of information in the successive image levels that degrades the lower level mipmap images.

However, as noted above, a hierarchical transform converts an input image to coefficients that represent different levels of resolution of that image. The multi-resolution signal renderer described herein leverages this concept in generating reduced resolution representations of an input signal.

For example, consider the problem of generating four mipmap levels: the bitmap images corresponding to Level 1 to Level 4, with Level 0 simply corresponding to the original image. Note that in practice, once Level 4 is obtained using the techniques described herein, higher levels of downsampling (i.e., Level 5 and beyond) can be generated directly from the Level 4 image using any conventional filtering method, even one with higher per-pixel computational cost. While the multi-resolution signal renderer is fully capable of generating these higher levels, the total number of pixels in the Level 4 bitmap is so small ($1/256^{th}$ of the total number of pixels of the original bitmap, assuming an N=4, and L=1 with an LBT-based hierarchical transform) that the total computational effort in generating all mipmap levels after Level 4 using conventional techniques will be much less then the effort to generate just Level 1, for example.

Assume that the hierarchical transform is a 2-level decomposition using LBTs of length N=4 for each level, with L=1 (that is, only one LBT coefficient per block (the DC coefficient) is brought to the next level), thereby resulting in a factor of 4 reduction in size between each level. Given this assumption, the main problem in this example is to generate bitmaps at resolutions that decrease by a factor of 2 (in each dimension), when each stage of an LBT reduces resolution by a factor of 4 (in each dimension). To solve this problem, the multi-resolution signal renderer operates in one of two modes to generate reduced resolution signals at factors of 2.

In general, the multi-resolution signal renderer generate signals at coded hierarchical resolution levels, DC coefficients of the transform coefficients are scaled, and then lowpass filtered to reduce aliasing in the signal. In contrast, to generate intermediate resolution signals between coded hierarchical resolution levels, the multi-resolution signal renderer retrieves the encoded coefficient blocks for the next highest resolution coding level, scales those coefficients as a function of the hierarchical resolution level, lowpass filters those blocks in the transform domain, performs an inverse transform, and then downsamples the resulting signal to the desired resolution, which in the case of a mipmap will be a factor of 2:1.

In view of the preceding discussion, it should be clear that the DC coefficient scaling factor is a multiple of the N/L resolution reduction at each hierarchical level, as used in encoding the LBT coefficients of the input signal. Consequently, at the first hierarchical encoding level below the full resolution decoding of the signal, the DC coefficients will be scaled by dividing the grouped DC coefficients by N/L. In the typical case, this will mean dividing the DC coefficients at the first hierarchical level by 4 (e.g., N/L=4/1=4), unless a larger factor, such as, for example 8, or different values of L are used in the hierarchical encoding. Similarly, at the second hierarchical level below the full resolution decoding of the signal, the grouped DC coefficients will be scaled by dividing the DC coefficients by $(N/L)^2$, or 16 in the typical case. Similarly, at the third hierarchical level below the full resolution decoding of the signal, the grouped DC coefficients will be scaled by dividing the DC coefficients by $(N/L)^3$, or 64 in the typical case.

As noted above, the LBT coefficients processed to generate the intermediate resolutions are also scaled. However, different scaling factors are used. In particular, the coefficients of xf2 by are divided by N/L=4 before processing those coefficients to render the reduced resolution mipmap at Level 3. Similarly, if the Level 5 mipmap were computed, then the corresponding transform coefficients would be divided by $(N/L)^2$=16 before processing those coefficients to render the reduced resolution mipmap at Level 5. These gain factors (N/L at Levels 2 and 3 and $(N/L)^2$ at Levels 4 and 5) are necessary so that the dynamic ranges of the coefficients matches those that would have been generated by inverse LBT operators.

Figure 7:
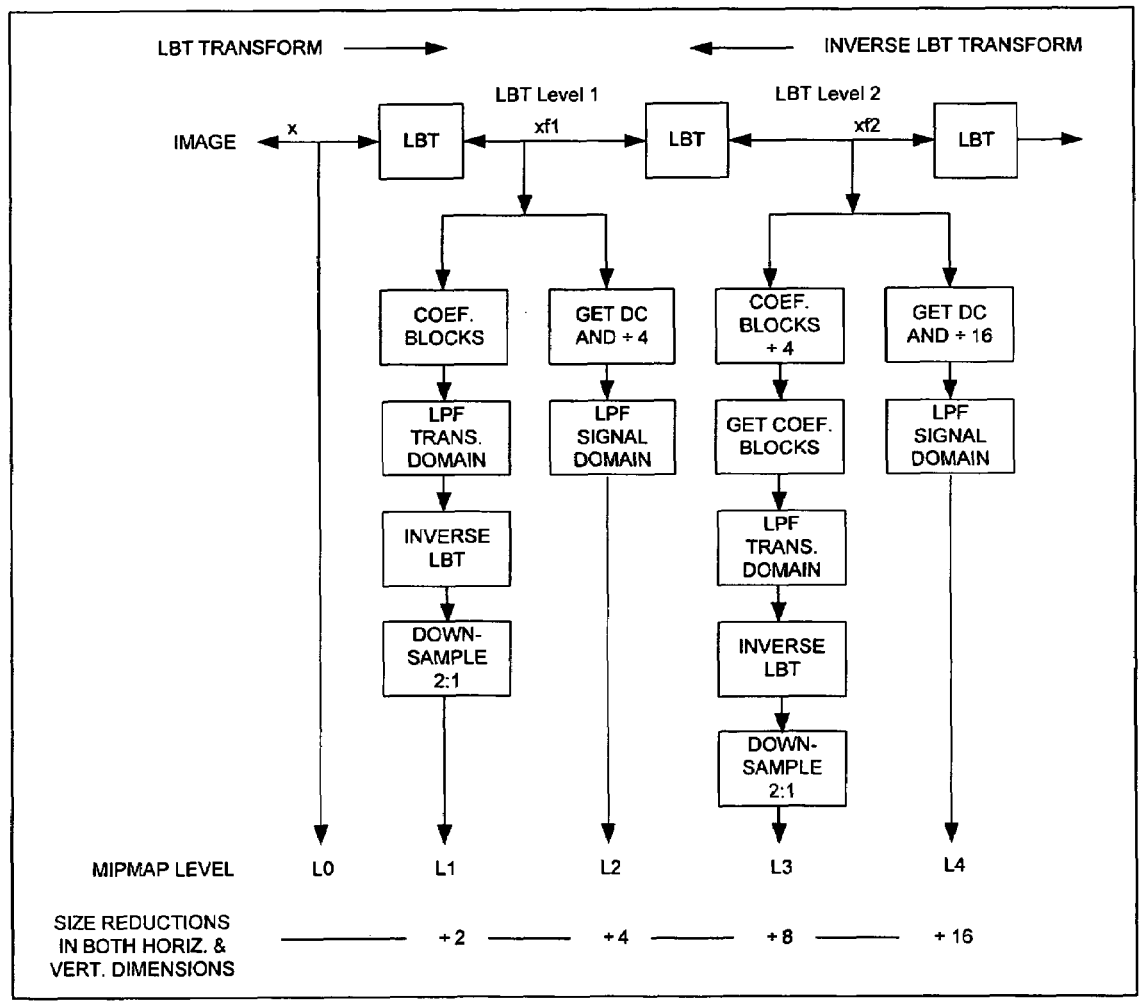
FIG. 7 provides an exemplary operational block diagram that illustrates the operation of the multi-resolution signal renderer of FIG. 2.

For example, as illustrated by FIG. 7, the multi-resolution signal renderer employs the following processes in generating mipmap Level 1 to Level 4 from an input image, x:

1. To generate the Level 1 bitmap image (variable L1 in FIG. 7), all of the LBT transform coefficients from the first level of LBT (variable xf1 in FIG. 7) are lowpass filtered in the transform domain, inverse transformed via an inverse LBT, then downsampled using a factor of 2:1. The resolution of the bitmap image resulting from this process is less than the original image (x) by a factor of 2.
2. To generate the Level 2 bitmap (variable L2 in FIG. 7), only the DC coefficients of the first level of LBT transform coefficients are used. In particular, these DC coefficients are divided by a factor of 4 (N/L=4), and then lowpass filtered in the signal domain to reduce aliasing artifacts. The resolution of the bitmap image resulting from this process is less than the original image (x) by a factor of 4.
3. To generate the Level 3 bitmap image (variable L3 in FIG. 7), all of the LBT transform coefficients from the second level of LBT (variable xf2 in FIG. 7) are first divided by a factor of 4 (N/L=4), lowpass filtered in the transform domain, inverse transformed via an inverse LBT, then downsampled using a factor of 2:1. The resolution of the bitmap image resulting from this process is less than the original image (x) by a factor of 8.
4. To generate the Level 4 bitmap (variable L4 in FIG. 7), only the DC coefficients of the second level of LBT transform coefficients are used. In particular, the DC coefficients are divided by a factor of 16 ($(N/L)^2$=16), and then lowpass filtered in the signal domain to reduce aliasing artifacts. The resolution of the bitmap image resulting from this process is less than the original image (x) by a factor of 16.

3.3 Lowpass Filtering:

As noted above, different types of lowpass filtering are applied depending upon whether the filtering is to be applied to the grouped DC coefficients, or to the transform coefficients.

3.3.1 Lowpass Filtering on the Transform Domain:

In general, the transform coefficients are filtered in the transform domain, which allows the use of a simple gain pattern applied to the LBT coefficients. Because of the smoothness and overlapping properties of the LBT basis functions, it has been observed that this LBT-domain filtering produces high-quality results, comparable to those obtained with conventional 4×4 or 6×6 bicubic filter.

The lowpass filter coefficients used for transform domain filtering of the transform coefficients can be chosen in many ways. However, assuming the signal is downsampled by a factor of two in each direction, the simplest separable lowpass filtering pattern would be to keep the four coefficients in the top left 2×2 coefficient block, setting all other to zero. In other words, applying the gain pattern illustrated in the gain matrix, G, below would provide an "ideal" gain pattern:

$$G = \begin{bmatrix} 1 & 1 & 0 & 0 \\ 1 & 1 & 0 & 0 \\ 0 & 0 & 0 & 0 \\ 0 & 0 & 0 & 0 \end{bmatrix}$$

However, in actual practice, such a gain matrix would not produce high-quality results, because of the abrupt transition of the gain factors from one to zero. In fact, a better compromise between sharpness and aliasing artifacts can be achieved by using a gain pattern that decays a bit more smoothly to zero as we move from the top left coefficient (lowest frequency) to the bottom right coefficient (highest frequency). Further, too smooth a decay tends to produce blurrier results. Consequently, in a tested embodiment, the gain pattern illustrated in the gain matrix, G', below provides a better gain pattern (when downsampling by a factor of two in each direction) for a wide variety of images:

$$G' = \begin{bmatrix} 1 & 1 & \frac{1}{4} & 0 \\ 1 & \frac{3}{4} & \frac{1}{4} & 0 \\ \frac{1}{4} & \frac{1}{4} & \frac{1}{8} & 0 \\ 0 & 0 & 0 & 0 \end{bmatrix}$$

However, it should be clear that for any particular application of the multi-resolution signal renderer, including the use of different downsampling levels, any different filtering pattern desired may be used in addition to those illustrated in the above examples. Consequently, the exemplary filters described above should not be interpreted as limiting the scope of filter/gain patterns that may be used by the multi-resolution signal renderer in performing transform domain filtering of transform coefficients.

Further, because the filters G and G' illustrated above include one or more zero coefficients, there will be a number of computational steps in the following inverse LBT which consist of a multiplication by zero. Therefore, in one embodiment, the computational overhead of the multi-resolution signal renderer is further reduced by eliminating these zero-multiplication steps in the inverse LBT. Consequently, the inverse LBT at each resolution level is customized to eliminate zero-multiplication steps corresponding to the zero's of the transform-domain filter designed for that resolution level. Conventionally, elimination of zero-multiplication steps in an inverse LBT is referred to as "pruning."

3.3.1 Lowpass Filtering on the Signal Domain:

As noted above, lowpass filtering of the grouped DC coefficients is performed as a signal domain filtering rather than as a transform-domain filtering. In particular, as discussed above, because of the smoothness of the LBT basis functions, the DC coefficients of an LBT representation, when grouped together, form an image that corresponds to the original image filtered and downsampled by a factor of N=4 in each dimension. However, because the DC basis function of the LBT direct transform is not as good a lowpass filter as those of the inverse transform, a signal domain lowpass filter (LPF) is applied to reduce high-frequency aliasing. Not much filtering is needed, so a relatively mild lowpass filter of any desired type can be used.

For example, in a tested embodiment of the multi-resolution signal renderer, a simple zero-phase FIR lowpass filter with a transfer function similar to the filter illustrated below was used successfully:

$$q(n) = h \cdot p(n-1) + (1-2h) \cdot p(n) + h \cdot p(n+1)$$
$$= (1-2h) \cdot p(n) + h \cdot [p(n-1) + p(n+1)]$$

where p(n) is the input to the filter and q(n) is the output. For a two-dimensional filtering effect, the filter illustrated above was applied in a separable manner, i.e. the rows were filtered first followed by a filtering of the columns (or vice-versa). The parameter $h<¼$ determines the strength of the lowpass filter. In practice, good results were obtained with h being on the order of about 0.08 or so. Again, it should be noted that the exemplary filter described above should not be interpreted as limiting the scope of any filter that may be used by the multi-resolution signal renderer in performing filtering of the grouped DC coefficients.

3.4 Examples of Computational Costs:

Reducing computational costs is a significant advantage of the multi-resolution signal renderer. For example, a typical bicubic 6×6 filtering approach needs 6 multiplications and 35 additions to compute each output pixel. That is equivalent to 1.5 multiplications and about 9 additions per input pixel. If the xf1 data (i.e., the first level transform coefficients, as described above and as illustrated in FIG. 7) is already available, then the operations described above can be implemented with about 9 additions and about 6 shifts per input pixel. Thus, in most practical cases the computational costs of generating mipmap Level 1 from either the traditional approach (filtering and downsampling Level 0) or the methods described herein are comparable.

However, when generating mipmaps, or other reduced resolution images, for an image that is only available in compressed from, which is often the case (e.g. in a video game, textures are stored in the game disk in compressed form; for personal digital photo collection, each image is also stored in compressed form), more significant reductions in computational overhead are realized. For example, when the image is available only in compressed form, in the traditional approach, the whole image is first decoded to obtain the full resolution bitmap (mipmap Level 0), followed by a filter/downsample approach to obtain Level 1.

In contrast, assuming that the compressed image is in a format that uses a hierarchical transform architecture, as described herein, if it is only desired to generate mipmap Level 1, for example, then it is only necessary to decode the transform coefficients up to xf1, and from it use the operations described above to obtain mipmap Level 1. Again, the traditional approach would require full decoding and then a filter/downsample operation on the encoded image. Thus, one stage of inverse LBTs and a filter/downsample operator is no longer needed when using the multi-resolution signal renderer described herein. Consequently, generation of mipmap Level 1 is speeded up by a factor of 2.

However, if it is desired to generate lower resolution mipmap levels, e.g. Level 2 or higher, then the computational savings are much more pronounced. For example, to generate only mipmap Level 4, in the traditional approach, it would be necessary to decode the whole image and then apply four filter/downsample steps to generate mipmap Level 4. In contrast, the processes described herein will generate the Level 4 mipmap by decoding only up to the xf2 values and then apply the signal-domain lowpass filter to generate mipmap Level 4. Thus, with the approach described herein, the generation of mipmap Level 4 is on the order of about 5× to 10× faster than the traditional approach, depending on the processing platform.

Another advantage of the multi-resolution signal renderer is a reduction in the amount of memory allocated to the process of low-resolution decoding. For the example of generating just mipmap Level 4, it is necessary to decode only the hierarchical LBT coefficients xf2, and from the decoded coefficients, to generate the image corresponding to mipmap Level 4 in place (that is, without the need of an additional memory buffer). Thus, additional memory does not need to be allocated for decoding the xf1 coefficients and the Level 0 bitmaps, as would be required by the traditional approach.

Figure 8:
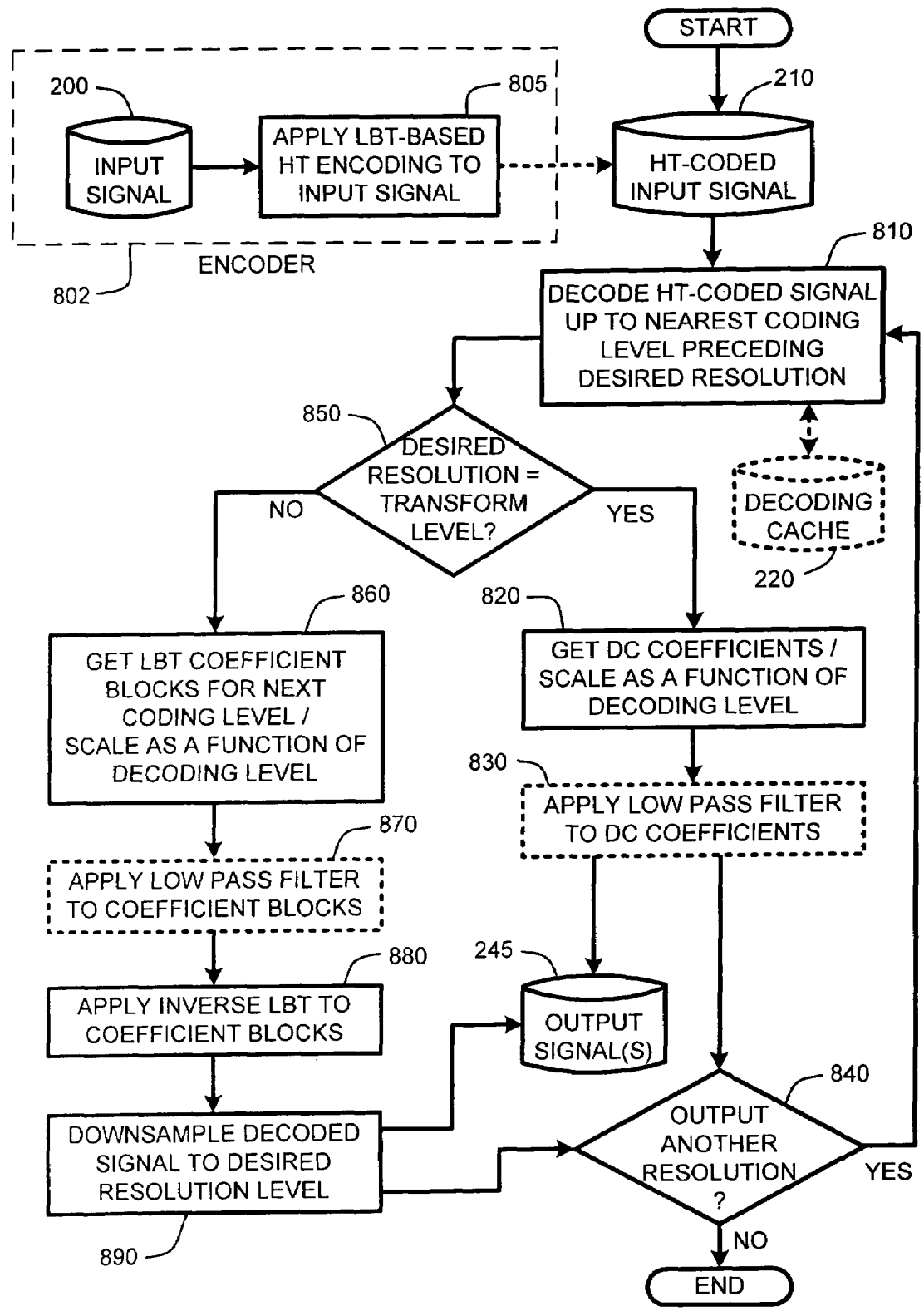
FIG. 8 provides an exemplary operational flow diagram that illustrates the operation of the multi-resolution signal renderer of FIG. 2.

4.0 Multi-Resolution Signal Renderer Operational Overview:

The processes described above with respect to FIG. 2 through FIG. 7, and in view of the detailed description provided in Section 3, are illustrated by the general operational flow diagram of FIG. 8. In particular, FIG. 8 provides an exemplary operational flow diagram which illustrates operation of the multi-resolution signal renderer. It should be noted that any boxes and interconnections between boxes that are represented by broken or dashed lines in FIG. 8 represent alternate embodiments of the multi-resolution signal renderer described herein, and that any or all of these alternate embodiments, as described below, may be used in combination with other alternate embodiments that are described throughout this document.

In general, as illustrated by FIG. 8, an input signal of interest 200 (usually a digital image, e.g. in a digital camera) is encoded 805, as indicated by the simplified flowgraph within box 802. At a decoder (e.g. a display device or picture viewing software in a digital computer), the hierarchical transform (HT) encoded signal 210 is then available for processing. The multi-resolution signal renderer operation begins by decoding 810 the HT-encoded signal 210 up to the nearest hierarchical encoding level not exceeding the desired resolution. As noted above, in one embodiment, an optional decoding cache 220 is used to store or otherwise cache decoded transform coefficient blocks for use in subsequent decoding operations rather than repeating the decoding operations once they have already been done for some hierarchical decoding level.

In either case, once the HT coded input signal 210 has been decoded up to the appropriate hierarchical encoding level, a determination is made 225 as to whether the desired reduced resolution version of the input signal 210 is equal to the resolution at the hierarchical level of the decoded portion of the input signal. In the case where the desired resolution corresponds to the current hierarchical level, the DC coefficients of the decoded transform coefficients are grouped together and scaled 320. As described above, the amount of scaling applied to the grouped DC coefficients is a function of the hierarchical transform level which is being decoded, and the number N of transform coefficients being mapped at each level. The result is a reduced resolution version of the original input signal 200 having the desired resolution. However, as described above, this reduced resolution version of the original input signal 200 may exhibit high frequency aliasing. Consequently, in one embodiment, the scaled DC coefficients are lowpass filtered 330 to reduce aliasing in the signal. The resulting signal is then output to the file, database, or cache 245 of output signals for use as desired.

As described above, for intermediate resolutions not directly corresponding to one of the hierarchical encoding levels, the decoded transform coefficient blocks decoded from the preceding hierarchical level are retrieved and scaled 360 as a function of the hierarchical resolution level, and then lowpass filtered in the transform domain using a gain pattern tailored to the particular resolution level being generated. Once the lowpass filtering 370 has been applied to the decoded transform coefficient blocks, an inverse transform operation on the coefficient blocks is performed 380, followed by a downsampling 390 of the resulting signal to achieve the desired intermediate resolution level. The resulting signal is then output to the file, database, or cache 245 of output signals for use as desired.

The processes described above then repeat for so long as it desired to generate additional 340 reduced resolution versions of the original input signal.

The foregoing description of the multi-resolution signal renderer has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the multi-resolution signal renderer. It is intended that the scope of the invention be limited not by this detailed description, but rather by the claims appended hereto.

What is claimed is:

1. A system for generating reduced resolution versions of an input signal from a hierarchical transform (HT) representation of the signal, comprising steps for:
   decoding an HT coded signal up to a highest current hierarchical transform level not exceeding a desired signal resolution to produce a plurality of decoded blocks of transform coefficients;
   if the desired signal resolution directly corresponds to the current hierarchical transform resolution level, scaling grouped DC coefficients of the decoded blocks of transform coefficients, and lowpass filtering the resulting signal in the signal domain to generate an output signal having the desired signal resolution; and
   if the desired signal resolution does not directly correspond to the current hierarchical transform resolution level, scaling the decoded blocks of transform coefficients, lowpass filtering the scaled decoded blocks of transform coefficients in the transform domain, applying an inverse transform to the filtered scaled decoded blocks of transform coefficients, and downsampling the resulting signal to generate an output signal having the desired signal resolution.

2. The system of claim 1 wherein lowpass filtering of the scaled decoded blocks of transform coefficients in the transform domain is accomplished using a filter tailored to one or more desired signal resolutions.

3. The system of claim 1 wherein the transform domain filter is embodied in a set of gain values for passing frequencies of the coefficient blocks approximately corresponding to the desired signal resolution.

4. The system of claim 3 wherein, for downsampling on the order of about 2:1, the set of gain values is on the order of approximately:

$$\begin{bmatrix} 1 & 1 & \frac{1}{4} & 0 \\ 1 & \frac{3}{4} & \frac{1}{4} & 0 \\ \frac{1}{4} & \frac{1}{4} & \frac{1}{8} & 0 \\ 0 & 0 & 0 & 0 \end{bmatrix}.$$

5. The system of claim 3 wherein zero-multiplication steps resulting from gain values of zero in the transform domain filter are eliminated from the inverse transform applied to the filtered scaled decoded blocks of transform coefficients.

6. The system of claim 1 wherein lowpass filtering the resulting signal in the signal domain is accomplished via application of a zero-phase FIR lowpass filter which operates to reduce high frequency aliasing in the resulting signal.

7. The system of claim 1 further comprising providing a decoding cache for storing decoded transform coefficient blocks for use in subsequent decoding operations.

8. The system of claim 1 wherein the amount of scaling applied to the grouped DC coefficients is an amount sufficient to ensure that the dynamic ranges of the scaled DC coefficients approximate those that would have been generated by inverse HT operators at the current hierarchical transform level.

9. The system of claim 1 wherein the amount of scaling applied to the decoded blocks of transform coefficients is an amount sufficient to ensure that the dynamic ranges of the scaled transform coefficients approximate those that would have been generated by inverse HT operators at the next higher hierarchical transform level above the current hierarchical transform level.

10. The system of claim 1 wherein the HT is composed of transform steps of lapped biorthogonal transforms (LBTs).

11. The system of claim 1 wherein the HT coded signal is an image, and wherein generating the output signal having the desired resolution comprises generating a set of mipmap images from the HT encoded image, said set of images representing a progressive series of reduced-resolution renditions of the original HT coded image, with dimensions that change by a constant factor from one reduced-resolution rendition to the next.

12. A method for generating reduced resolution versions of a signal encoded via a hierarchical cascade of lapped biorthogonal transforms (LBT), comprising using a computing device to:
   decode blocks of transform coefficients from the encoded signal up to a highest current hierarchical level not exceeding a desired signal resolution; and
   for desired signal resolutions not directly corresponding to the current hierarchical transform level, using the computing device for:
      scaling the decoded blocks of transform coefficients,
      lowpass filtering the scaled decoded blocks of transform coefficients in the transform domain,
      applying an inverse transform to the filtered scaled decoded blocks of transform coefficients, and
      downsampling the resulting signal to generate an output signal having the desired resolution.

13. The method of claim 12 wherein scaling the decoded blocks of transform coefficients, comprises scaling the decoded blocks of transform coefficients by an amount sufficient to ensure that the dynamic ranges of the scaled decoded blocks of transform coefficients approximate those that would have been generated by inverse LBT operators at the next higher hierarchical transform level above the current hierarchical transform level.

14. The method of claim 12 wherein lowpass filtering the scaled decoded blocks of transform coefficients in the transform domain comprises applying a set of gain factors to the scaled decoded blocks of transform coefficients for passing frequencies of the coefficient blocks approximately corresponding to the desired signal resolution.

15. The method of claim 14 wherein, for downsampling on the order of about 2:1, the set of gain values is on the order of approximately:

$$\begin{bmatrix} 1 & 1 & \frac{1}{4} & 0 \\ 1 & \frac{3}{4} & \frac{1}{4} & 0 \\ \frac{1}{4} & \frac{1}{4} & \frac{1}{8} & 0 \\ 0 & 0 & 0 & 0 \end{bmatrix}.$$

16. The method of claim 12 wherein generating an output signal having the desired signal resolution for a resolution directly corresponding to the current hierarchical transform level comprises:
grouping DC coefficients of the decoded blocks of transform coefficients; and
scaling the grouped DC coefficients to generate an output signal having the desired resolution.

17. The method of claim 16 further comprising lowpass filtering the output signal in the signal domain to reduce high frequency aliasing in the output signal.

18. The method of claim 16 wherein the grouped DC coefficients are scaled by an amount sufficient to ensure that the dynamic ranges of the scaled DC coefficients approximate those that would have been generated by inverse LBT operators at the current hierarchical transform level.

19. A physical computer readable medium having computer executable instructions stored thereon for generating reduced resolution versions of a signal encoded via a hierarchical cascade of lapped biorthogonal transforms (LBT), comprising:
decoding blocks of transform coefficients of the encoded signal up to a highest current hierarchical level not exceeding a desired signal resolution;
for desired signal resolutions not directly corresponding to the current hierarchical transform level:
scaling the decoded blocks of transform coefficients,
lowpass filtering the scaled decoded blocks of transform coefficients in the transform domain,
applying an inverse transform to the filtered scaled decoded blocks of transform coefficients, and
downsampling the resulting signal to generate an output signal having the desired resolution; and
for desired signal resolutions directly corresponding to the current hierarchical transform level:
grouping DC coefficients of the decoded blocks of transform coefficients,
scaling the grouped DC coefficients to generate an output signal having the desired resolution, and
lowpass filtering the output signal in the signal domain to remove high frequency aliasing in the output signal.

20. The computer readable medium of claim 19 wherein the lowpass filtering applied to the scaled decoded blocks of transform coefficients in the transform domain comprises applying a set of gain values designed to pass frequencies of the blocks of transform coefficients approximately corresponding to the desired signal resolution.

21. The computer readable medium of claim 20, wherein for downsampling on the order of about 2:1, the set of gain values is on the order of about:

$$\begin{bmatrix} 1 & 1 & \frac{1}{4} & 0 \\ 1 & \frac{3}{4} & \frac{1}{4} & 0 \\ \frac{1}{4} & \frac{1}{4} & \frac{1}{8} & 0 \\ 0 & 0 & 0 & 0 \end{bmatrix}.$$

22. The computer readable medium of claim 19 wherein the encoded signal is an image, and wherein generating reduced resolution versions of the encoded signal comprises generating a set of mipmap images from the encoded image.

23. The computer readable medium of claim 19 further comprising providing a memory cache for storing the decoded blocks of transform coefficients for use in subsequent decoding operations.

24. The computer readable medium of claim 19 wherein the amount of scaling applied to the decoded blocks of transform coefficients is sufficient to ensure that the dynamic ranges of the scaled decoded blocks of transform coefficients approximate those that would have been generated by inverse LBT operators at the next higher hierarchical transform level above the current hierarchical transform level.

25. The computer readable medium of claim 19 wherein the amount of scaling applied to the grouped DC coefficients is sufficient to ensure that the dynamic ranges of the scaled DC coefficients approximate those that would have been generated by inverse LBT operators at the current hierarchical transform level.

* * * * *